Patented Sept. 2, 1952

2,609,350

UNITED STATES PATENT OFFICE 2,609,350

TEXTILE FINISHING AGENT

Carl Spatt, Binghamton, N. Y., assignor to General Aniline & Film Corporation, New York, N. Y., a corporation of Delaware No Drawing. Application December 21, 1946, Serial No. 717,821

6 Claims. (Cl. 260—29.6)

The present invention relates to improved textile material having a permanent sizing thereon and to the novel process and composition employed in producing the same.

Many textiles are commonly sized or impregnated with some material which imparts a desirable finish thereto. However, many of the materials employed for sizing textiles (for instance, starch) are water-soluble and so are not wash-fast, and are removed from the fabric in the course of one or at most several launderings or dry-cleanings. In order to impart a permanent finish to textiles, it has been proposed to impregnate them with various synthetic resins which would remain on the fabric even after repeated washings. However, most of the resins and similar materials which have been suggested for use as textile finishing agents are not satisfactory since they either impart too harsh a finish to the fabric, make it too brittle, weaken the fabric, or are otherwise objectionable.

I have now found that a desirable permanent finish may be imparted to textiles, and particularly to those of vegetable origin (i. e. cotton, linen, rayon and the like), by impregnating the fabric with a composition comprising a mixture of (1) a polyhydric alcohol and (2) a synthetic resin obtained by polymerizing maleic anhydride together with a vinyl compound capable of being polymerized and containing a single $>C=CH_2$ group and subsequently baking or heating the impregnated fabric so as to effect a "cross-linking" esterification reaction which sets the finish on the fabric. There is thus imparted to the fabric a desirable finish and stiffness which is wash-fast.

While a wide variety of polyhydric alcohols have been employed in the impregnating composition embodied in this invention and have been found to impart a desirable finish to textiles, it has been found that textiles treated in accordance with the present invention (wherein the polyvinyl alcohol was employed as the polyhydric alcohol) possessed a superior stiffness and washfastness when polyvinyl alcohol was employed as the polyhydric alcohol component of the sizing composition and therefore in the preferred embodiment of this invention polyvinyl alcohol is employed as the polyhydric alcohol component of the sizing composition embodied in this invention.

However, many of the advantages of the present invention are obtained when other polyhydric alcohols are employed in the sizing composition and therefore such materials as dextrine, mannitol, glycerine, polyglycerine, partially hydrolyzed polyvinyl acetate, diethylene glycol or mixtures thereof, and the like, may be employed in place of polyvinyl alcohol as the polyhydric alcohol component of the composition embodied in this invention.

The synthetic resins obtainable by polymerizing maleic anhydride together with a vinyl compound which is capable of being polymerized and containing a single $>C=CH_2$ group, which are employed as another component of the composition embodied in the present invention and used in practicing the process and producing the finished textile material thereof, are those of the type described in U. S. Patent No. 2,047,398 to Voss and Dickhauser, which are obtained by polymerizing a mixture of maleic anhydride and a vinyl or vinylidine compound containing a single $>C=CH_2$ group such as, for example, vinyl ethers (e. g. methyl vinyl ether, ethyl vinyl ether, phenyl vinyl ether, etc.); vinyl esters (e. g. vinyl acetate, etc.); vinyl halides (e. g. vinyl chloride, etc.); arylethylene (e. g. styrene, etc.); acrylic, methacrylic, haloacrylic acids and esters, and the like. The relative proportions of maleic anhydride and said polymerizable compound employed in producing this synthetic resin may be varied through a relatively wide range and satisfactory products have been obtained when the ratio of maleic anhydride to said polymerizable compound was within the range of 1:4 to 4:1 by weight. In general, however, it has been found that superior products are obtained for the purposes of the present invention when some excess of said polymerizable compound is employed in producing the synthetic resin.

The synthetic resins obtained by polymerizing maleic anhydride and a compound containing a single $>C=CH_2$ group are acid in character due to the presence therein of free carboxyl groups and it has been found that when compositions comprising a mixture of a polyhydric alcohol and a resin of this type are employed for impregnating textiles, the fabric is frequently tendered; i. e., its tear strength is substantially lowered. Such tendering of the fabric occurs only when the pH of the impregnating composition falls below 3.2 and the tendering becomes quite noticeable when the pH of the impregnating composition is below about 3.0. It is therefore possible to impart a desirable finish to the fabrics by impregnating them with a composition comprising a mixture of a polyhydric alcohol and a resin of the type obtained by polymerizing a mixture of maleic anhydride and a compound capable of being polymerized and containing a single $>C=CH_2$ group without tendering the fabric, provided the synthetic resin employed in the impregnating composition has a pH above 3.0 and preferably above 3.2. It has also been found that a desirable finish is imparted to the fabric and the fabric is not tendered, even when the synthetic resin has a lower pH than that specified, provided the pH of the impregnating composition is adjusted so that it lies above 3.0 and preferably 3.2. The pH of the impregnating composition may readily be adjusted by incorporating a sufficient amount of an alkali therein, so that its pH falls above 3.0. Examples of basic substances useful for altering the pH of the impregnating compositions include ammonia, alkali and alkali earth metal hydroxides (such as potassium hydroxides, calcium hydroxide); basic salts of the alkali and alkali earth metals (such as potassium carbonate, sodium carbonate, disodium phosphate, etc.); organic amines (such as primary amines, methylamine, monoethanolamine, aniline, etc.); secondary amines (such as dimethylamine, diethanolamine, methyl aniline, etc.); tertiary amines (such as trimethylamine, triethanolamine, dimethyl aniline, etc.) and the like. However, it has been found that if the pH of the impregnating solution is too high, the finish imparted to the cloth is not permanent. Apparently, this is due to the fact that when the impregnating solution has too high a pH, the cross-linking esterification reaction does not occur to a sufficient extent to produce a permanent finish. In order to impart a permanent finish to the fabric, it is necessary that the impregnating composition have a pH below 4.5 and preferably below 4.0. Therefore, in practicing the present invention the impregnating composition which is employed is one which has a pH within the range of 3.0 to 4.5 and preferably within the range of 3.2 to 4.0, this desired pH being obtained by incorporating an alkali in the composition.

The quantitative proportions in which the components of the impregnating composition may be used in carrying out the invention varies within wide limits. For example, a ratio of 8 parts of the polyhydric alcohol to 1 part of the mixed polymer of a >C=CH$_2$ containing compound and maleic anhydride may be present in the impregnating solution, but it is also possible to use a mixture of 1 part of the polyhydric alcohol to 5 parts of the mixed polymer. While the quantitative proportions of the components of the impregnating composition may be varied within the range above specified, it has been found that the best finishes are obtained when at least an equivalent amount (and preferably a slight excess up to about 3 parts) of polyhydric alcohol is employed for each part of synthetic maleic anhydride polymerizable vinyl compound resin.

This novel textile impregnating composition may be applied to textiles in the form of a solution, emulsion, or dispersion in water or some other inert liquid. It will be apparent that the solution employed for impregnating the fabric must not be too concentrated or viscous or an uneven finish may be obtained. On the other hand, the solution employed for impregnating the fabric must contain a sufficient amount of the impregnating composition so that the fabric will pick up and retain a sufficient amount thereof to impart the desired finish thereto. The amount of impregnating composition which should be incorporated in the solution employed to impregnate the fabric in order that a sufficient amount will be retained by the fabric to impart the desired finish thereto can readily be determined by simple preliminary experiments.

The impregnated fabric is dried and then heated to cause the "cross-linking" esterification reaction, thereby resulting in a permanent finish. The rate of "cross-linking" is dependent on temperature, the reaction taking place much more rapidly at elevated temperatures than at lower temperatures. For example, one may produce the desired effect by heating the impregnated cotton fabric at about 175° C. for a few seconds, 150° C. for a few minutes or 100° C. for a few hours. The upper limit of temperature and time of heating is dependent on the resistance of the fabric to tendering and scorching.

It has been found that the impregnating composition of the present invention, when applied as above described, is useful as a permanent stiffening agent (sizing agent) for cellulosic fabrics and as a slip-proofing agent for rayon. The finish thus imparted to the fabric is washfast; i. e. in the case of the preferred composition, comprising the polyvinyl alcohol and the polymerization product of maleic anhydride and a vinyl compound in the preferred pH range, the composition resists removal from fabrics appreciably by 5 to 10 soap washings. It also resists dry-cleaning, retards chlorine absorption and increases the gas-fading time, this latter property being particularly noticeable in the case of rayon impregnated textiles.

The following examples, in which the parts are by weight, illustrate preferred specific embodiments of the invention:

EXAMPLE 1

A 3.03% solution of the polymerization product of methyl vinyl ether and maleic anhydride is prepared by dissolving 3.95 parts of the interpolymer in 126.55 parts of distilled water by stirring the mixture. Dissolution of the mixed polymer occurs rapidly at temperatures approaching the boiling point of water. A 7.50% solution of polyvinyl alcohol is prepared by dissolving 6.75 parts of polyvinyl alcohol in 83.25 parts of distilled water by high-speed mixing; the polyvinyl alcohol is dispersed after about 5 minutes stirring at room temperature; the mixture is heated to 85–90° C., at which point solution appears to occur rapidly. A semi-transparent solution is obtained after 10 minutes stirring at 85–90° C. The solution is then cooled to room temperature. The solution of the mixed polymer and the solution of polyvinyl alcohol are mixed to give a solution having a pH of approximately 2.2. This solution has the following composition:

| | Per cent |
|---|---|
| Polymerization product of methyl vinyl ether and maleic anhydride | 1.79 |
| Polyvinyl alcohol | 3.05 |
| Distilled H$_2$O | 95.16 |
| Total | 100.00 |

The pH of the mixture is adjusted to about 3.5 by the addition of various basic substances as shown in Table I below. The quantities of bases added were all small, the highest being 1.7 ml.; therefore, the dilution effect was negligible.

The impregnating composition employed in this example was also prepared by the following procedure: A mixture of 17.9 parts of the polymer from methyl vinyl ether and maleic anhydride, 30.5 parts of polyvinyl alcohol and 952 parts of distilled water is stirred for 5 minutes at room temperature to disperse ingredients. The mixture is heated to 90° C. with continuous agitation. After about 7 minutes at 90° C., it may be noted that dissolution is taking place by the fact that the speed of the stirrer decreased suddenly, indicating that the solution was becoming more viscous. The mixture is heated with stirring at 90° C. for an additional 15 minutes, then cooled to room temperature. The pH of the mixture is adjusted to about 3.5 and padded onto 80 x 80 cotton cloth, dried and baked as described above. The composition prepared in this manner was similar in all respects to that previously described.

The solution, as prepared above, was padded onto 80 x 80 cotton cloth with a wet pick-up up to 100% depending on the stiffness of the product desired. Each cloth was then dried on the hot can (approximately 110° C.), then baked at 150° C. for 2 minutes, soaped in a water solution containing 0.5% green soap and 0.5% sodium carbonate at 50° C. for 5 minutes, rinsed in running water for approximately 5 minutes and then ironed dry on a rotary iron. Depending on the amount of wet pick-up, a full to crisp washfast finish is obtained.

The rip resistance of the finished cloth was determined by a tongue tear test using a Scott tester, using a procedure similar to that described in the ASTM Standards on Textile Materials, Committee D-13, 1943, p. 56. The rip test consisted of measuring the force in pounds necessary to rip a rectangular piece of cloth from a cut made in the short edge of the cloth. The values reported are averages of seven warp and seven filling samples cut from each sample of finished cloth. By a warp rip sample is meant one having its longer dimension parallel to the filling yarns. A filling rip specimen is one having its longer dimension parallel to the warp yarns. The results of the rip tests are shown in Table I.

EXAMPLE 2

A mixture of 7.5 parts of the polymer of styrene and maleic anhydride, 0.5 part of concentrated ammonium hydroxide and 240 parts of distilled water was heated at 90° C. with stirring for 2 hours. The resultant clear solution was cooled. To 130.5 parts of this composition was added 90 parts of a 7.5% aqueous solution of polyvinyl alcohol (du Pont Elvanol Grade 71-24). The resultant solution had a pH of 3.1. A second mixture prepared as above, except that 1.7 parts of ammonium hydroxide was added, had a pH of 4.2. The mixtures were padded on 80 x 80 cotton cloth to approximately 100% wet pick-up, the cloths were dried on the hot can at 110° C. and then baked at 150° C. for 2 minutes. Immediately after baking, they were soaped at 50° C. for 5 minutes in a water solution containing 0.5% green soap and 0.5% sodium carbonate, then rinsed in running water for 5 minutes and finally ironed dry. The finishes so produced were washfast and of desirable stiffness.

Rip strength data on the finished cloths follows:

*Rip strength*

| pH of Solution | Warp | Filling |
| --- | --- | --- |
| 3.1 | 1.90±0.40 | 1.20±0.15 |
| 4.2 | 1.90±0.20 | 1.10±0.10 |

EXAMPLE 3

A textile impregnating composition was prepared as in Example 2, except that the polymer of vinyl acetate and maleic anhydride was substituted for the polymer of styrene and maleic anhydride. The resulting product, after adjusting the pH to 3.5, imparted a crisp, permanent finish to cellulosic fabrics.

*Table I*

| Test No. | Additive Agent for adjustment of pH | ml. of Additive Agent | pH of Impregnating Solution | Rip Strength (lb.) | |
| --- | --- | --- | --- | --- | --- |
| | | | | Warp | Filling |
| 1 | NH4OH [1] | 0.60 | 3.57 | 1.8±0.3 | 1.8± 0.5 |
| 2 | NH4OH [1] | 0.60 | 3.55 | 1.85±0.25 | 1.30±0.20 |
| 3 | NH4OH [1] | 0.60 | 3.55 | 1.70±0.20 | 1.40±0.40 |
| 4 | NH4OH [1] | 0.70 | 3.53 | 1.80±0.25 | 1.25±0.35 |
| 5 | NH4OH [1] | 0.60 | 3.52 | 1.80±0.25 | 1.35±0.25 |
| 6 | NH4OH [1] | 0.62 | 3.60 | 2.10±0.30 | 1.65±0.30 |
| 7 | NH4OH [1] | 0.60 | 3.52 | 1.75±0.40 | 1.50±0.30 |
| 8 | NaOH [2] | 1.50 | 3.46 | 1.85±0.30 | 1.25±0.15 |
| 9 | Methylamine (40%) | 0.90 | 3.40 | 18.0±0.30 | 1.30±0.20 |
| 10 | Dimethylamine (33%) | 1.70 | 3.40 | 1.85±0.30 | 1.15±0.20 |
| 11 | Ethanolamine | 0.55 | 3.48 | 1.95±0.50 | 1.30±0.25 |
| 12 | Diethanolamine | 1.00 | 3.55 | 1.60±0.20 | 1.45±0.45 |
| 13 | Triethanolamine | 1.20 | 3.48 | 1.75±0.40 | 1.45±0.20 |
| CONTROL EXPERIMENTS | | | | | |
| 14 | No pH adjustment of impregnating solution | | 2.39 | 1.50±0.20 | 1.10±0.20 |
| 15 | do | | 2.39 | 1.45±0.20 | 1.05±0.10 |

[1] NH4OH used contained approximately 29% NH3.
[2] NaOH solution used contained 5 g. NaOH in 30 g. of aqueous solution.

Cotton cloth finished with the mixture in tests 1 through 15 retained approximately half of the finish through 10 washes of 1 hour each at 205° F. with an aqueous solution of 0.5% green soap and 0.2% sodium carbonate. It was noted that in the cases of those solutions whose pH was not adjusted (13 through 15), a marked brittleness was imparted to the cloth.

I claim:

1. The method of treating cellulosic textiles to size the same and impart a permanent finish thereto, which comprises impregnating a cellulosic textile fabric with an aqueous solution of a mixture consisting essentially of polyvinyl alcohol and a synthetic resin obtained by polymerizing maleic anhydride, together with an excess of up to four times the weight thereof of a compound capable of being polymerized and containing a single >C=CH₂ group and an amount of a basic substance such that said solution of said mixture has a pH of from 3.0 to 4.5 and heating the thus-impregnated fabric to set the size, said polyvinyl alcohol and said synthetic resin being present in such proportions that at least an equivalent amount up to three parts by weight of polyvinyl alcohol are present for each part of said synthetic resin, said mixture of polyvinyl alcohol and said synthetic resin in aqueous solution having a pH less than 3 in the absence of said basic substance.

2. The sized textile fabric produced by the process as defined in claim 1.

3. The method as defined in claim 1, wherein the compound, capable of being polymerized and containing a single >C=CH₂ group which is polymerized with maleic anhydride, is methyl vinyl ether.

4. The sized textile fabric produced by the process as defined in claim 3.

5. A composition adapted for use as a textile size for cellulosic materials, consisting of a solution in water of polyvinyl alcohol and a synthetic resin obtained by polymerizing maleic anhydride, together with an excess of up to four times the weight thereof of a compound capable of being polymerized and containing a single >C=CH₂ group, and an amount of a basic substance such that said solution has a pH of from 3.0 to 4.5, said polyvinyl alcohol and said synthetic resin being present in such proportions that at least an equivalent amount up to three parts by weight of polyvinyl alcohol are present for each part of said synthetic resin, said solution having a pH less than 3 in the absence of said basic substance.

6. The composition as defined in claim 5, wherein the compound capable of being polymerized and containing a single >C=CH₂ group is methyl vinyl ether.

CARL SPATT.

REFERENCES CITED

The following references are of record in the file of this patent:

UNITED STATES PATENTS

| Number | Name | Date |
|---|---|---|
| 2,047,398 | Voss et al. | July 14, 1936 |
| 2,324,739 | Stoops et al. | July 20, 1943 |
| 2,356,879 | Pense et al. | Aug. 29, 1944 |
| 2,418,688 | Atwood | Apr. 8, 1947 |
| 2,419,880 | Blyler et al. | Apr. 29, 1947 |
| 2,469,408 | Powers et al. | May 10, 1949 |
| 2,469,409 | Powers et al. | May 10, 1949 |
| 2,487,223 | Cuprey | Nov. 8, 1949 |

OTHER REFERENCES

Matthews: pages 36, 37, and 38, "Application of Dyestuffs," published 1920 by John Wiley & Sons, N. Y.